United States Patent [19]

Tarumi et al.

[11] Patent Number: 4,518,976

[45] Date of Patent: May 21, 1985

[54] RECORDING APPARATUS

[75] Inventors: Noriyoshi Tarumi; Yukio Okamoto; Kiyoshi Kimura; Masakazu Fukuchi; Tadashi Miwa; Kunio Ito, all of Hachioji, Japan

[73] Assignee: Konishiroku Photo Industry Co., Ltd., Tokyo, Japan

[21] Appl. No.: 552,087

[22] Filed: Nov. 15, 1983

[30] Foreign Application Priority Data

Nov. 17, 1982 [JP] Japan .............................. 57-201663
Dec. 13, 1982 [JP] Japan ..............................57-188217[U]

[51] Int. Cl.[3] .................... G01D 15/06; G01D 15/12; G03G 15/00

[52] U.S. Cl. .............................. 346/153.1; 346/74.2; 355/3 TR

[58] Field of Search .................... 346/150, 153.1, 74.2; 355/3 TR, 14 TR

[56] References Cited

U.S. PATENT DOCUMENTS 4,455,079 6/1984 Miwa et al. .................... 355/3 TR

*Primary Examiner*—Thomas H. Tarcza
*Attorney, Agent, or Firm*—Jordan B. Bierman

[57] ABSTRACT

The present invention is such that in a recording apparatus comprising a toner image carrier and an intermediate image transfer material which receives the toner image transferred from the image carrier and then transfers the toner image onto the subsequent transfer sheet material (recording sheet), and an image transfer section for transferring the toner image onto the moving transfer sheet material comprising a transfer roller and pressure roller pressing thereon, the recording apparatus has the following pre-heating means comprising a heat member and a pressing member which is located at a position prior to the transfer section and which, brings the subsequent transfer sheet material into close contact with or presses the subsequent transfer sheet material against the periphery of the pressure roller, the member being provided at least on its side facing the transfer sheet material with a heat-resistant, elastically deformable porous material.

13 Claims, 14 Drawing Figures

RECORDING APPARATUS

BACKGROUND OF THE INVENTION

The present invention relates to recording apparatus, and more particularly to electrostatic recording or electrophotographic copying apparatus which comprises an image carrier such as a toner image-carrying photoreceptor drum, etc., and an intermediate image transfer material, e.g., in the belt form, onto which is transferred the toner image on and from the image carrier. The transferred image on the intermediate transfer material is further transferred onto a sheet material, or a subsequent image transfer material, under a heated condition, and the image transfer section where the image transfer is made onto the foregoing image transfer material is comprised of rotating means (e.g., a roller) for the image transfer and another rotating means (e.g., a roller) for bringing the transfer material into pressure contact with the rotating means for the image transfer.

In conventional electrostatic or electrophotographic recording apparatus, the image formation is generally carried out in accordance with the process that an electrostatic image is formed on an image carrier such as a photoreceptor drum, the electrostatic image is then developed by a developer comprised of a toner or a mixture of a toner and a carrier, and the resulting toner image is electrostatically transferred onto an image transfer sheet, and further the transferred image is fixed.

However, in the case where the toner image is transferred electrostatically onto a transfer sheet (a recording material) by a transfer electrode such as, e.g., a corona discharger, the image transfer process is accompanied by a turbulence of the electrostatic charge, deteriorating the resulting toner image. Further, if a recently recommended conductive electromagnetic toner or the like is used as the toner, a further turbulence of the electrostatic charge is produced, thus causing a substantially untransferable condition.

For improving the above described disadvantage in the electrostatic image transfer, attempts have been made to use a pressure roller to press a toner image onto a transfer sheet, but the method has the drawback that the transfer efficiency is unsatisfactory with the resulting toner about half transferred in density.

Hereupon, there has been proposed a method wherein the above toner image is pressed to be transferred onto an intermediate transfer material in the belt form comprising rubber as the transfer layer, and the transferred toner image is then pressed to be transferred and fixed onto a transfer sheet under a heated condition by use of a heating roller, as described in Japanese Patent Examined Publication Nos. 41679/1971 and 22763/1973, Japanese Patent Publication Open to Public Inspection (hereinafter referred to as Japanese Patent O.P.I. Publication) No. 78559/1974 and U.S. Pat. No. 3,993,825, and the like. In such a method, a toner image is pressed to be transferred onto the surface layer of an intermediate transfer material, the surface layer being comprised of a rubber-type material such as, e.g., silicone rubber, fluororubber, or the like, having, on one hand, mold releasability and, on the other hand, adherence to toner particles when subjected to pressure. The toner image on the intermediate transfer layer is brought into contact with and heated by a heating means such as a heating roller to become fused and concurrently pressed to be transferred and fixed onto a fed-in transfer sheet. Namely, because the toner image fused by heating is readily transferred according to the above mold releasability and fixed onto a transfer sheet, the method brings about no deterioration of the toner image resolution due to the transfer process, and further realizes a highly efficient image transfer operation.

In the recording apparatus of the prior art, the above transfer-fixing section is comprised of a heating roller and a pressure roller for pressing against the heating roller, and an intermediate transfer material in the belt form and a moving sheet material (transfer paper) are passed being pressed by and between these rollers, whereby the toner image on the intermediate transfer belt is transferred and fixed onto the transfer paper (recording paper). In this instance, if a heat source is arranged also inside the pressure roller and both rollers are heated together, both intermediate transfer belt and recording paper can be maintained at a sufficient temperature for transferring and fixing the same, so that the process can become an excellent measure for improving the transferability as well as fixability.

FIG. 1 is a schematic illustration of conventional recording apparatus having an intermediate transfer belt. In the region along the periphery of image carrier 1 such as a rotary drum-type photoreceptor drum are provided known latent image forming mechanism 2, developing mechanism 3 and cleaning mechanism 4 in the described order in the rotating direction of the drum. In transfer region A between developing mechanism 3 and cleaning mechanism 4, intermediate transfer material 5 in the endless belt form is brought into pressure contact with the above-mentioned image carrier 1 by pressure (transfer) roller 6. Intermediate transfer belt 5, as shown in FIG. 2, consists of flexible film base plate 20 such as of a polyimide and an adhesive material, e.g., silicone rubber layer 21 coated thereon. The above intermediate transfer belt 5 is suspended over pressure roller 6, heating roller 7 and tension roller 8, and moves in transfer region A in the same direction and at the same speed as those of toner image carrier 1 toward intermediate transfer material heating region B of heating roller 7. Cleaning roller 12 is provided facing opposite to tension roller 8, and further neutralizer member 13 is provided for neutralizing the electrostatic charge of belt 5. At the parting point of intermediate transfer belt 5 from heating roller 7 or in transfer-fixing region C in the proximity of the parting point is provided pressure roller 9 so as to press on heating roller 7. Transfer sheet (recording paper) heating plate 10 is provided along transfer sheet heating region D immediate before transfer-fixing region C in transfer sheet moving path P set up so as to pass transfer-fixing region C.

In the above apparatus, the toner image formed on the image carrier is finally transferred and fixed onto the image transfer sheet in the following manner:

Toner image T on toner image carrier 1 is first formed by developing by means of developing mechanism 3 of the latent image formed by latent image forming mechanism 2. That is, in the case of utilizing electrophotography, image carrier 1 composed of such a photoreceptor as of the selenium, organic compound, zinc oxide or cadmium sulfide binder type, or the like, is used to be formed thereon with an electrostatic latent image by charging the entire peripheral surface of image carrier 1 by means of latent image forming mechanism 2, and then subjecting the charged area to an imagewise exposure. In the case of utilizing the electrostatic recording process, image carrier 1 composed of a dielectric consisting of a conductive substrate and dielectric surface layer coated thereon is used to be formed thereon with an electrostatic latent image converted from an imagewise signal by means of a multi-stylus electrode or of an ion control electrode. Alternatively, image carrier 1 composed of a magnetic material may be used to be formed thereon with a magnetic latent image converted by means of a magnetizing head from an imagewise signal.

The thus formed latent image, if it is an electrostatic image, is visualized by developing mechanism 3 with a toner of colored particles charged in the polarity opposite to that of the charge forming a latent image. If the toner used herein is a one-component conductive magnetic toner, the development is made by the charge induced by the toner. Where the development is made by use of the one-component conductive magnetic toner in the magnetic brush developing process, a layer of the toner can be formed as a single-particle layer or as much thin a layer as close to it, so that this method is particularly favorable in respect that it can produce rapidly the final image excellent in the quality as well as in the durability thereof, and enables to carry out a satisfactory image transfer without selecting a transfer material. If the latent image is a magnetic latent image, a magnetic toner should be used to develop the latent image. The use of the magnetic toner produces no blur at the time of the image transfer, thus producing a clear image.

The thus formed toner image T on image carrier 1 is transferred in transfer region A by the pressure of pressure roller 6 onto intermediate transfer belt 5. The adhesive layer, particularly silicone rubber layer, of intermediate transfer belt 5, due to its appropriate surface adhesiveness and rubber elasticity enough to gain the toner at a low temperature, can attract sufficiently to capture the toner to the intermediate transfer belt side, overcoming the toner retainability of image carrier 1 in transfer region A. The surface energy of the silicone rubber layer is sufficiently small as compared to ordinary image transfer materials, so that when, in transfer-fixing region C which will be described hereinafter, the transfer sheet, under the condition that the toner is heated to become fluid, is pressed on the intermediate transfer belt, the toner becomes strongly adhering to the transfer sheet, whereby the image can be almost completely transferred and fixed. Heating roller 7 is a hollow metallic cylinder such as of aluminum having thereinside a heater *7a* such as, e.g., an infrared lamp. The surface temperature of this metallic roller is controlled so as to fall under such an appropriate temperature range that in the region between the contact starting point E with intermediate transfer belt 5 and transfer-fixing region C; that is, in the intermediate transfer belt heating region B, the intermediate transfer belt 5 with toner image T thereon is heated, and the toner image is sufficiently transferred and fixed in region C. Pressure roller 9 in transfer-fixing region C is provided as an auxiliary heating roller for improving the transferability and fixability, and is a heat-resistant elastic roller provided therearound with a surface layer such as of a silicone rubber and also provided thereinside with a heater lamp 9A. Transfer material heating plate 10 shown in the example of FIG. 1 is in such a form as adaptable to be in contact with the periphery of pressure roller 9, and, when the above transfer sheet passes between the surface of pressure roller 9 and the transfer material heating plate 10, the heating plate heats the transfer sheet to such an extent that the toner image on intermediate transfer belt 5 is sufficiently transferred and fixed onto the transfer sheet in transfer-fixing region C. The coefficient of friction of the surface of pressure roller 9 is made larger than that of the surface of transfer material heating plate 10, so that with the movement of the surface of pressure roller 9 due to the revolution thereof, the transfer sheet rubs the surface of transfer material heating plate 10 to be heated and transported to transfer-fixing region C. The thus heated transfer sheet, in transfer-fixing region C, passes being pressed by and between the intermediate transfer belt 5 in advance heated together with the toner image by heating roller 7 and the pressure roller 9, whereby the toner of the toner image fluidized by the heating is pressed to be transferred and fixed onto the transfer sheet.

The transfer sheet that has passed transfer-fixing region C is generally transported along intermediate transfer belt 5 and separated from intermediate transfer belt 5 by tension roller 8. If tension roller 8 is small in diameter, the separation of the transfer sheet from intermediate transfer belt 5 may be more easily made. Further by swaying intermediate transfer belt 5, possible deviation of the belt can be prevented.

Intermediate transfer belt 5 that has passed transfer-fixing region C is partially naturally cooled, and again subjected to the subsequent image transfer at transfer region A, and further at transfer-fixing region C the transfer-fixing process is repeated.

In FIG. 1, 11 is a cleaning roller which, when pressure roller 9 is stained with the toner, removes the toner from the roller.

In the recording apparatus of FIG. 1, a recording paper as the transfer sheet is heated to a sufficient temperature for image transfer and fixing when passing between the transfer roller 7 and the pressure roller 9 (i.e., the transfer-fixing section), and the period of time required for the passing of the recording paper is relatively short. In order to obtain a sufficient temperature for the transfer and fixing during this short period, it is necessary to raise the temperature of the transfer roller and pressure roller to a considerably higher degree than the toner softening starting temperature. The temperature of the transfer roller and pressure roller being a little higher than the toner softening starting temperature is not considered sufficient for the transfer and fixing of the recording paper, so that no desired transfer-fixing process may be carried out. On the other hand, however, if the temperature of the transfer roller and pressure roller is increased to be excessively higher than the toner softening starting temperature, the power consumption becomes unfavorably increased.

Upon this, as shown in FIG. 1, a heating plate 10 as means for in advance heating the recording paper was devised to be provided in the proximity of pressure roller 9 so that a sufficient temperature for the transfer and fixing of the recording paper can be obtained before the recording paper is put in between transfer roller 7 and pressure roller 9. The means, heating plate 10, allows the temperature of the transfer roller and pressure roller to be lower than the abovementioned temperature, thus enabling to save the power consumption.

However, it has now been found that because heating plate 10 is composed of a rigid material having no flexibility, when a recording sheet passes between the heating plate 10 and pressure roller 9, the recording sheet cannot be brought into close contact with heating plate 10 (further with pressure roller 9), so that the temperature of the recording sheet become uneven locally. That is, even if the recording sheet passes being nipped between the heating plate 10 and pressure roller 9, because heating plate 10 is rigid, it is impossible to make even the interfacial contact with the recording sheet, and besides, this is furthered by the dispersion of the disposition accuracy of heating plate 10 and of the relative dimensional accuracy between the heating plate 10 and pressure roller 9. Besides, changes in the width of the path for the recording sheet can occur due to the roatation shake of pressure roller 9, the changes also hindering the uniformity of the interfacial contact or smooth advance of the recording sheet. However, in such the in-advance heating, for example, the recording sheet is to be transported with being in contact with the pressure roller that presses the recording sheet against the heating plate over an extensive area, so that there is produced a large friction between the sheet and the pressure roller, thereby tending to cause the sheet to jam.

OBJECT AND SUMMARY OF THE INVENTION

It is therefore an object of the present invention to provide a recording apparatus wherein a transfer material such as a recording sheet is effecitively in advance heated without causing any jamming thereof by way of making even the interfacial contact of the recording sheet with the pressure roller before the recording sheet is put in between the transfer roller and the pressure roller.

The present invention is such that in a recording apparatus comprising a toner image carrier and an intermediate image transfer material which receives the toner image transferred from the image carrier and then transfers the toner image onto the subsequent transfer sheet material (recording sheet), and an image transfer section for transferring the toner image onto the moving transfer sheet material comprising a transfer roller and pressure roller pressing thereon, the recording apparatus has the following pre-heating means comprising a heat member and a pressing member which is located at a position prior to the transfer section and which, brings the subsequent transfer sheet material into close contact with or presses the subsequent transfer sheet material against the periphery of the pressure roller, the member being provided at least on its side facing the transfer sheet material with a heat-resistant, elastically deformable porous material.

DETAILED DESCRIPTION OF THE INVENTION

Figure 1:
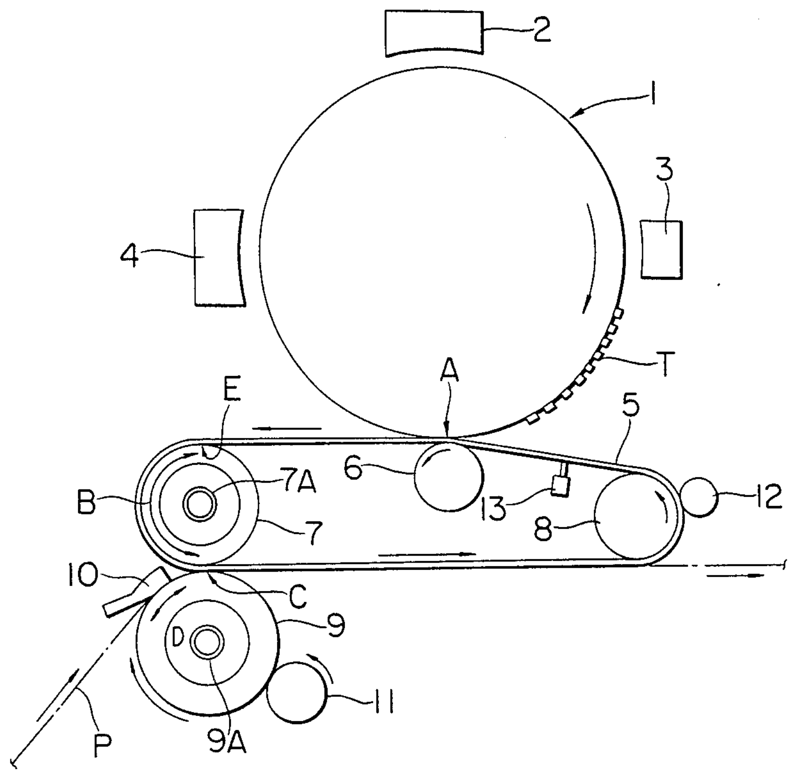
FIG. 1 is a schematic illustration of conventional recording apparatus.
Figure 2:
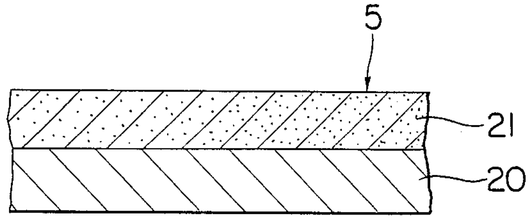
FIG. 2 is a cross-sectional view of an image transfer belt material.
Figure 3:
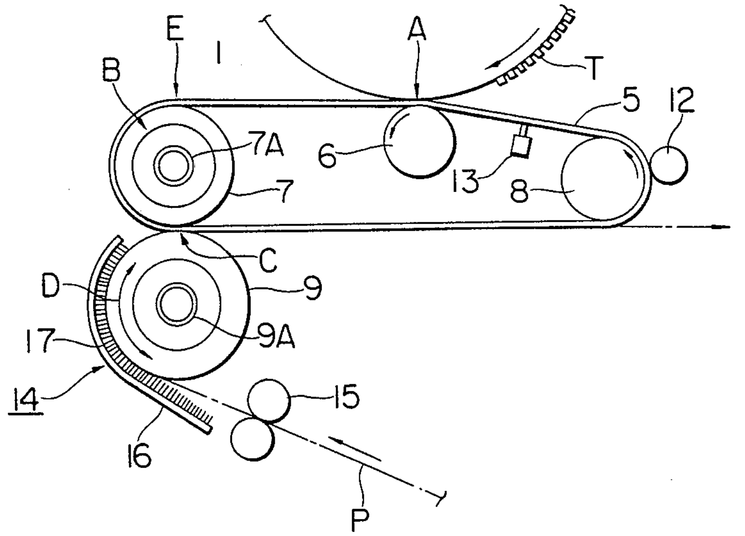
FIG. 3 is a schematic illustration of the principal part of a recording apparatus in an example of the present invention.

FIG. 3 shows the recording apparatus in an example of the present invention, wherein to the parts common to those of FIG. 1 used for the description of the prior art are applied the common notations, and descriptions thereof are left out.

The noticeable construction in the recording apparatus of FIG. 3 is a member 14 (transfer material pressing member) for bringing recording sheet P into close contact with or pressing recording sheet P against a portion of the periphery of pressure roller 9 at a position prior to transfer-fixing region C.

Referring more particularly to the transfer material pressing member 14, the recording sheet P transported in from feed rollers 15 advances with being pressed against pressure roller 9 by transfer material pressing member 14 toward transfer-fixing region C. Pressure roller 9 and transfer roller 7 together are at a higher temperature than the toner softening starting temperature, so that when recording sheet P is transported to transfer-fixing region C with being brought by transfer material pressing member 14 into sufficiently close contact with pressure roller 9 with their interfacial area made larger, the recording sheet P is sufficiently in advance heated by pressure roller 9 to sufficient temperature for the transfer-fixing of a toner image. In order to carry out this, it is necessary to bring recording sheet P into uniform contact with pressure roller 9 by transfer material pressing member 14 because if the recording sheet, as in conventional apparatus, is transported with its surface in uneven contact with pressure roller 9 to transfer-fixing region C, the temperature of the recording sheet becomes differing locally, making it impossible to uniformly heat the recording sheet.

Thus, if the transfer material pressing member 14, as shown in FIG. 3, is composed of preferably a heat insulating support plate 16 and an elastically deformable porous material 17 provided on the side facing the recording sheet. If the recording sheet is pressed by the porous material 17 onto pressure roller 9, then the recording sheet is transported with its entire surface in uniform contact with pressure roller 9 to transfer-fixing region C. Consequently, the difference in temperature between the recording sheet and pressure roller 9 is reduced, and the whole recording sheet is heated uniformly to a sufficient temperature for transferring and fixing a toner image thereonto.

For the porous material 17 of transfer material pressing member 14, if a heat-resistant fluororesin-type felt or piled material is used, even if there occurs somewhat dispersion in the disposition of the material or somewhat rotation shake of pressure roller 9, the porous material 17 is elastically deformed, so that the recording sheet is always pressed by uniformly sufficiently close-contacting force against pressure roller 9, and thus the sheet is uniformly heated even at a high line speed. Further, the porous material 17 is not only excellent in the temperature keeping effect but has so small coefficient of friction as to reduce the rotation load of pressure roller 9, and further almost repellents the attaching thereto of the toner due to the peculiar nature of its fluororesin.

If transfer material pressing member 14 is thus provided, then the recording sheet is pre-heated sufficiently by pressure roller 9, so that only raising the temperature of transfer roller 7 and pressure roller 9 to a degree slightly higher than the toner softening starting temperature is sufficient as compared to conventional recording apparatus, and even without providing heating plate 10, the recording sheet can be heated to a sufficient temperature for the transfer and fixing of a toner image thereonto.

The use of transfer material pressing member 14 improves the condition of the interfacial contact of the recording sheet with pressure roller 9, and as a result, the recording sheet becomes heated to a sufficient temperature for the transfer and fixing of a toner image, thus resulting in the reduction of the recording period of time. And because of the excellent heat-insulating effect of the porous material 17 on the recording sheet facing side of transfer material pressing member 14, the pressing member has also an effect of preventing the radiation of heat from pressure roller 9.

Because transfer material pressing member 14 is always pressed uniformly on pressure roller 9, the pressing member appears to hinder the rotation of pressure roller 9, but the recording sheet facing side of transfer material pressing member 14, if made of or surface-coated with a less-friction-type material such as fluororesin, would not apply any large load to pressure roller 9.

Figure 4:
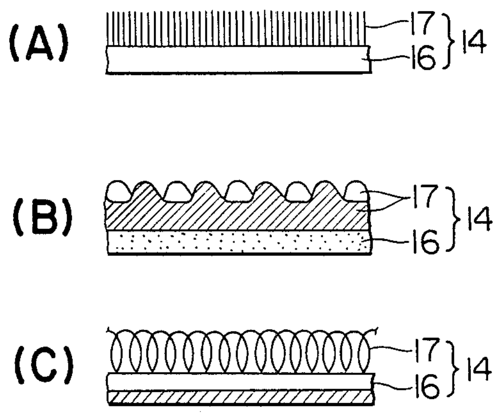
FIG. 4 shows constructional examples of the transfer sheet material pressing member used in the example of FIG. 3.

In addition, the above porous material 17 may be a less-friction-type fluororesin called "Teflon" or "Toyoflon," or may also be the same heat-resistant material in the pile form. FIG. 4 shows constructional examples of the porous material-having transfer material pressing member. Pressure roller 9 should be of a material surface-coated with fluororesin or with a mold releasable rubber.

Figure 5:
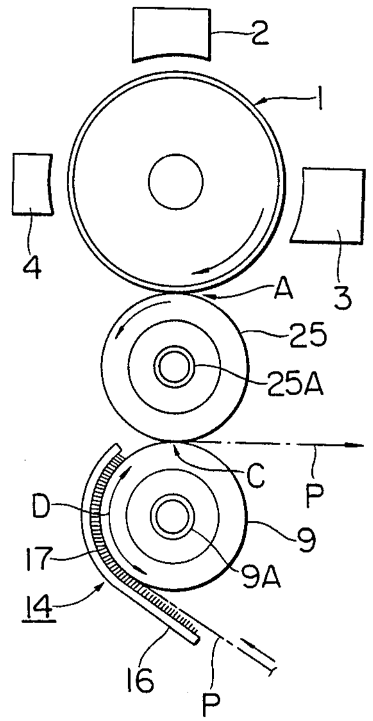
FIG. 5 is a schematic illustration of the recording apparatus according to another example of the present invention.

FIG. 5 shows an example wherein the intermediate image transfer material in the belt form is modified to be of the roller type, and wherein to the parts common to those described above are applied the common notations, and descriptions thereof are left out.

In this example, a pressure roller 9 presses from the underneath on an intermediate image transfer roller 25 comprising a metallic roller base provided therearound with an adhesive layer such as of silicone rubber as the image transfer layer, both rollers 25 and 9 having thereinside heaters 25A and 9A, respectively, like those previously mentioned. The system, which uses such an intermediate image transfer roller, is of a much simplified construction as compared to the previously described intermediate transfer belt system, and is also advantageous in respect that the temperature of the roller is well controllable.

In this roller-type system, as in the instance of FIG. 3, pressing member 14 may be provided at a position prior to transfer-fixing region C to uniformly pre-heat a recording sheet.

According to this device, a recording sheet as the transfer material, prior to being put in between the transfer roller and the pressure roller, is brought by the porous elastic material into close contact with or pressed onto the pressure roller, so that the contact of the recording sheet with the pressure roller becomes uniform areally with the elastic deformation of the porous elastic material, thereby heating the recording sheet to a sufficient temperature for the transfer-fixing operation. Accordingly, unlike conventional recording apparatus, the temperature of the transfer roller and the pressure roller is allowed to be kept at a slightly higher degree than the toner softening starting temperature, thus saving the power consumption as well as requiring no heating plate. In addition, the above porous elastic material is deformable following pressure, so that not only is the interfacial contact between the recording sheet and the pressure roller improved but also no large load is applied to the rotation of the pressure roller, thus realizing a smooth transport of the recording sheet.

The technical idea of the present invention as described in the above examples may be further modified; for example, the above member 14, aside from being used for pressing the recording sheet against pressure roller 9, may also be applied to the pre-heating means 30 as shown in FIG. 1. Also in this instance, the uniform heating of the recording sheet is secured by the elastic deformability of the porous material 17. Pressing member 14 itself of support 16 may also be provided with resistance heating means, or alternatively a reflective layer (not shown) may be provided between the support plate 16 and porous material 17 to further reduce the radiation of heat to thereby improve the heating efficiency. The porous material 17 may be not necessarily a felt or pile material but be, e.g., a sponge-like elastic layer.

Figure 6:
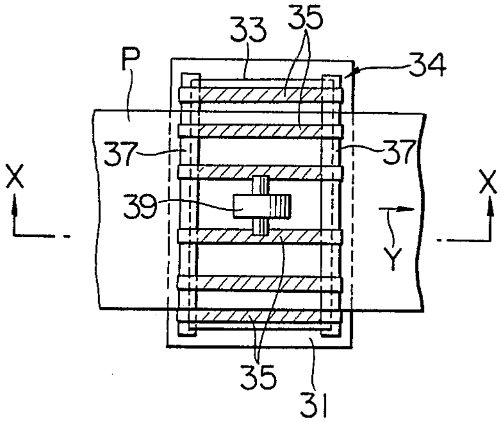
FIG. 6 is a plan view of the transfer sheet pre-heating means according to an example of the present invention.
Figure 7:
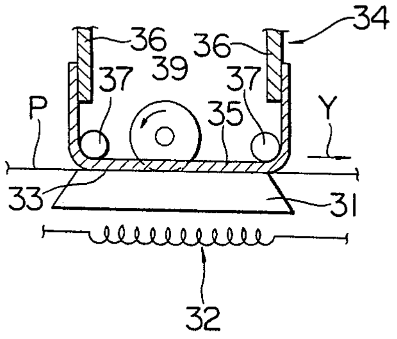
FIG. 7 is the cross-sectional view as seen in the direction of arrows from the line X—X of FIG. 6.

Another example of the present invention, to which preheating means 30 provided prior to pressure roller 9 is applied, will be illustrated below:

In FIGS. 6 and 7, heating plate 31 is heated by heater 32 to a sufficient temperature for pre-heating recording sheet P. On the upper flat surface 33 of heating plate 31 is provided as shown in the figures a pressing member 34 for pressing recording sheet P onto flat surface 33. That is, the pressing member 34 is so constructed that both ends of each of a plurality of heat-resistant tapes 35 provided stretching in parallel with the moving direction of recording sheet P are fixed to a supporting member such as tape support plates 36, and tapes 35 are pressed by tape hold-down means 37 onto heating plate 31.

Hereupon, because tapes 35 are arranged in parallel, the contact areas or pressing areas between tapes 35 and recording sheet P are present intermittently in the direction almost intersecting the moving direction Y of recording sheet P. Consequently, the total interfacial contact area between tapes 35 and recording sheet P are reduced, thereby effectively preventing possible jamming phenomenon of the recording sheet due to the friction between the two as well as allowing recording sheet P to move smoothly.

For the transport of recording sheet P, it is desirable that a transport roller 39 be provided in a space, particularly in the central space between the tapes 35, and recording sheet P be transported with being pressed by the roller 39.

The above heat-resistant tape 35 is desirable to be comprised of a small coefficient of friction-having flexible heat-resistant resin such as a fluororesin, e.g., Teflon, polyimide e.g., Kapton polyamidoimide, polyamide, polyester, cellulose-containing resin, or the like. Further, these tapes are preferably made of a porous material as described before. Tapes 35, with their held-down position as shown in FIG. 7, are well deformed following the surface condition of heating plate 31 to bring recording sheet P into sufficient contact with (sufficiently heated by) heating plate 31 as well as to allow the smooth movement of recording sheet P.

Figure 8:
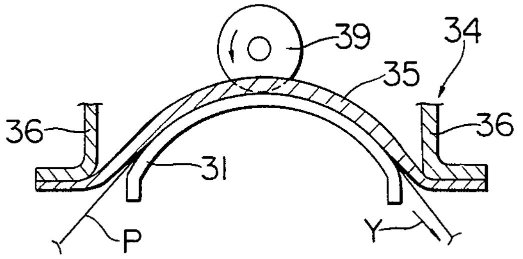
FIGS. 8 and 9 show the respective cross-sectional views of the transfer sheet heating means in two other examples of the present invention.

In order to carry out the heating of recording sheet P more effectively, as shown in FIG. 8, the surface on the recording sheet-facing side of heating plate 31 can be in the convex form. In this instance, because heating plate 31 has a convexly curved surface, the pressed condition of recording sheet P becomes more sufficient due to the better attachment effect of the sheet to the curved surface, thus enabling to carry out satisfactorily the heating of the sheet. Besides, in this instance, the tape hold-down means 37 as shown in FIG. 7 is unnecessary.

Figure 9:
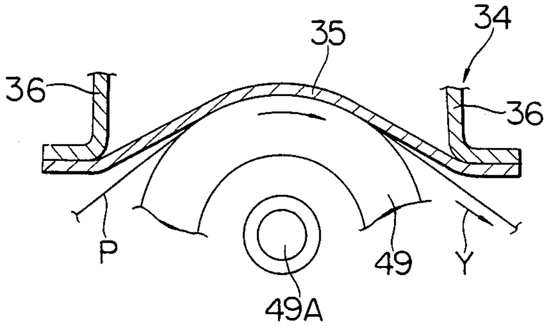

FIG. 9 shows an example which uses a heating roller 49 having a similar curve surface to the heating plate 31 of FIG. 8. Heating roller 49 is heated by a heat source 49A such as a heater lamp provided thereinside to a sufficient temperature for the transfer and fixing of a toner image, and also usable as pressure roller 9 of the transfer-fixing section, and further useful for making the recording apparatus compact as well as for improving the transportability of recording sheets. Also in this instance, the heating of recording sheet P can be performed as much satisfactory as in FIG. 8, and at the same time the paper transport is carried out by roller 49, so that the transport roller 39 is unnecessary.

In addition, the instances in FIGS. 8 and 9 also use pressing member 34 comprising a plurality of heat-resistant tapes 35 fixed by support plate 36 as shown in FIGS. 6 and 7.

The preferred embodiment of the above pressing member 34 is subsequently illustrated in reference to the recording apparatus of FIG. 10, wherein to the common parts to those of FIG. 1 are applied the common notations, and descriptions thereof are left out.

Pressure roller 9 in transfer-fixing region C may be one that is constructed as an auxiliary heating roller for better improving the transferability and flexibility, and is a heat-resistant, elatstic roller provided therearound with a surface layer such as of silicone-type rubber, and provided thereinside with a heater lamp 9A (see FIG. 9). Transfer material pressing member 34 in the example of FIG. 10, as described in FIG. 9, is in the form adapted to be in contact with and along the periphery of pressure roller 9, the surface of which pressing member should be heated to such an extent as to sufficiently transfer and fix the toner image on intermediate image transfer material 5 by roller 9 onto the recording sheet in transfer-fixing region C. The coefficient of friction of the surface of pressure roller 9 is made larger than that of tapes 35, so that with the movement of the surface of pressure roller 9 due to the rotation thereof, the recording sheet is heated by roller 9 with sliding on the surface of tapes 35, and transported to transfer-fixing region C. The thus heated recording sheet, in transfer-fixing region C, is pressed by and between the intermediate image transfer belt 5 that is heated together with a toner image by roller 7 and the pressure roller 9, whereby the toner of the toner image is pressed in the condition of becoming fluidized, so that the image is positively transferred and fixed onto the recording sheet.

The recording sheet that has passed transfer-fixing region C is usally transported along intermediate transfer belt 5, and then separated by tension roller 8 from transfer belt 5. In this instance, if the diameter of tension roller 8 is made smaller, the separation of the recording sheet from the intermediate transfer belt 5 can be more smoothly performed, and further by swaying the belt, the deviation of the belt can be prevented. Intermediate transfer belt 5 that has passed transfer fixing belt C is partially naturally cooled and again receives the subsequent image transferred in image transfer region A, and after that repeats the transfer-fixing process in transfer-fixing region C.

Figure 10:
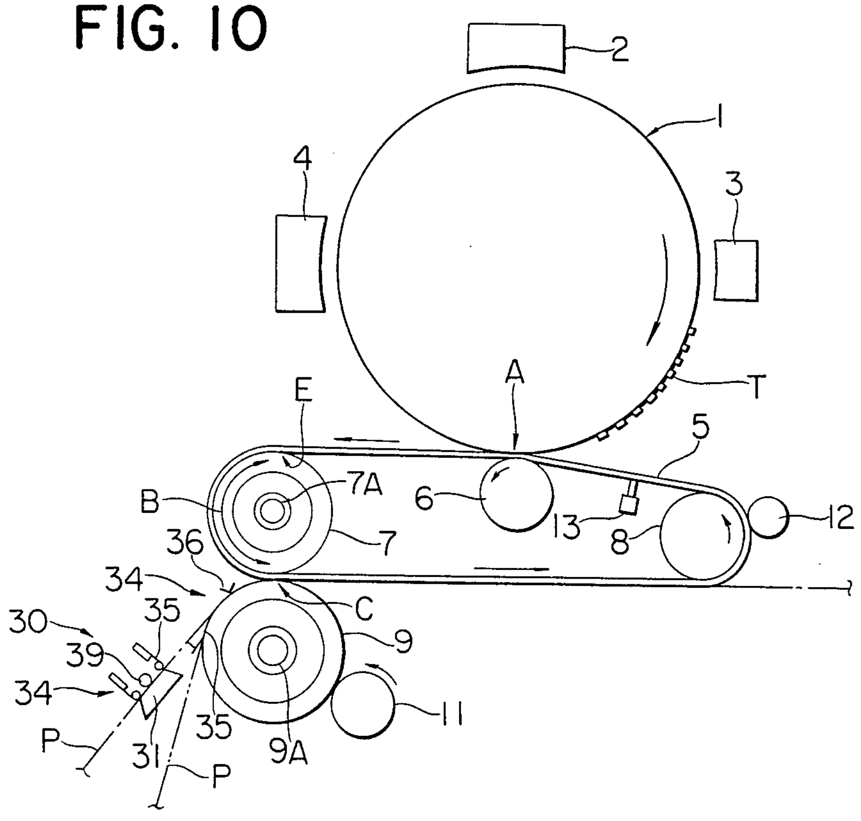
FIG. 10 is a schematic illustration of the recording apparatus of the present invention.

In FIG. 10, 11 is a cleaning roller, which, when the toner is attached to pressure roller 9, cleans out the pressure roller.

In addition, in the example of FIG. 10, intermediate transfer belt 5, toner, and recording sheet P are together heated, so that the necessary temperature for each of them can be reduced, whereby each of them need not be individually heated to excess, and besides, partly because the escaping amount of heat can be suppressed to be smaller to thereby largely improve the total heat utilization efficiency, the total energy consumption can be largely saved. Further, the transfer and fixing of the toner image can be carried out rapidly. Because intermediate transfer belt 5 is not heated to excess, even if toner image carrier 1 is one having in its basic property a delicate nature to heat like a photoconductive photoreceptor, the good property thereof is not impaired, or there occurs no such unfavorable phenomenon that part of the component material of intermediate image transfer belt 5 attaches to toner image carrier 1. Further, intermediate transfer belt 5 is subjected to no excessively high temperature nor drastic temperature change, so that it can retain its durability over an extensive period, or requirements for the heat resistance of materials for the intermediate transfer belt is alleviated to widen the selectable range of materials therefor, thereby allowing the reduction of cost. Furthermore, the toner is not overheated and therefore does not become fluid to excess, resulting in no blur of the toner image nor offset phenomenon. Besides, the recording sheet is neither overheated nor thermally deformed nor creased, thus naturally causing substantially no danger of fire at all.

Figure 11:
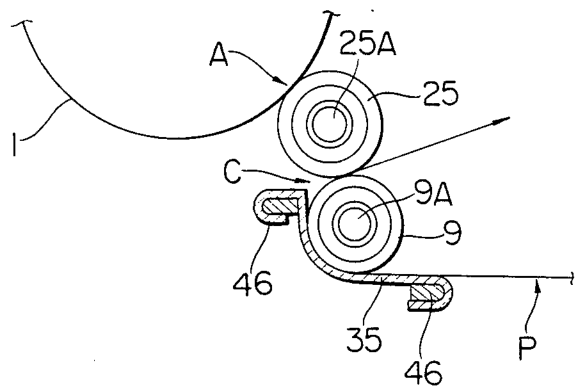
FIG. 11 is a schematic illustration of the principal part of another recording apparatus of the present invention.
Figure 12:
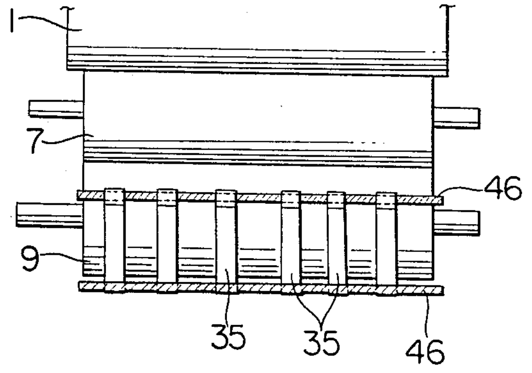
FIG. 12 is the left side view of the principal part of FIG. 11.

FIG. 11 shows a recording apparatus wherein the intermediate transfer material is of the roller type, and wherein to the common parts to those of the above example are applied the common notations, and descriptions thereof are left out.

In this example, pressure roller 9 presses from the underneath on intermediate transfer roller 25 comprised of a metallic roller base provided therearound with a adhesive layer such as of silicone rubber as the image transfer layer, both rollers 25 and 9 having thereinside the above-described type heaters 25A and 9A, respectively.

The system which uses such an intermediate transfer roller has the advantage that its construction is much simplified and the temperature control of the roller is easily made as compared to the foregoing intermediate transfer belt.

A plurality of heat-resistant tapes 35 similar to the foregoing tapes 35, at a position prior to transfer-fixing region C, is provided along the recording sheet moving direction to press on the periphery of pressure roller 9 to pre-heat a recording sheet P. Both ends of each of tapes 35 are fixed to and supported by a supporting member such as support rods 46.

Figure 13:
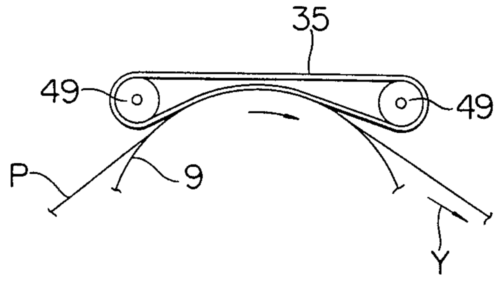
FIGS. 13 and 14 are the respective cross-sectional views of the transfer sheet heating means of two still further examples.

FIG. 13 shows an example in the modified form of that of FIG. 9, wherein the heat-resistant tapes 35 for pressing recording sheet P against pressure roller 9 are endlessly suspended over a pair of rollers 49 which are driven (or fixed) by the movement of pressure roller 9. If tapes 35, as described above, are thus endlessly rotatably provided, the transport of recording sheets can be more smoothly performed.

Figure 14:
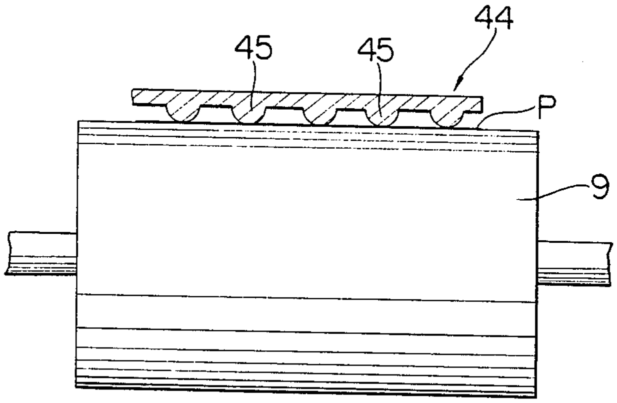

FIG. 14 shows a pressing member 44 which, unlike the above examples, has striped projections 45 in intermittent contact with recording sheet P instead of using heat-resistant tapes. Pressing member 44 is comprised preferably of a flexible heat-resistant film which is deformable following the periphery of roller 9, and, by the contact of the above striped projections 45 alone with recording sheet P, reduces the friction therebetween to thereby prevent possible jamming of recording sheets, and also accomplishes the sufficient heating of recording sheets.

In the recording apparatus provided with the preheating means as described in the above examples of the present invention, the pressing areas of the moving sheet material onto the heating means are along the moving direction of the moving sheet material, and at the same time provided intermittently in the direction intersecting the moving direction, so that the sheet material is not in contact with the pressing member more than being necessary, and is transported smoothly with being heated quite sufficiently by the heating means. The sheet material, without jamming, is heated to a desired temperature, and transported smoothly.

The present invention is as has been described in reference to the examples, but the above examples are further modifiable in accordance with the technical idea of the invention. For example, the above-described heat-resistant tapes or the arranging pattern of the pressed contact area may be diversified.

What is claimed is:

1. In a recording apparatus including a toner image carrier, an intermediate image transfer member onto which is transferred said toner image on said toner image carrier and which further transfers said toner image onto a subsequent transfer material, and an image transfer section for transferring said toner image onto said subsequent material, said section comprising a transfer roller and a pressure roller pressing on said transfer roller, said recording apparatus comprising a pre-heating means for pre-heating said subsequent transfer material at a position prior to said image transfer section, said pre-heating means comprising a heat member and a pressing member which brings said subsequent transfer material into contact with said heat member, wherein at least one side of said pressing member facing said subsequent transfer material comprises a heat-resistant, elastically deformable porous material.

2. The recording apparatus of claim 1, wherein said pressing member is provided with pressing areas on said subsequent transfer material, said pressing areas being arranged intermittently in the direction intersecting the moving direction of said subsequent transfer material.

3. The recording apparatus of claim 1, wherein said pressure roller is included with a heat source and commonly used as said heat member.

4. The recording apparatus of claim 2, wherein said pressure roller is included with a heat source and commonly used as said heat member.

5. The recording apparatus of claim 1, wherein said elastically deformable porous material is a heat-resistant resin.

6. The recording apparatus of claim 5, wherein said resin is fluororesin, polyimide resin, polyamidoimide resin, polyamide resin, polyester resin or cellulose-containing resin.

7. The recording apparatus of claim 3, wherein said elastically deformable porous material is a fluororesin type felt or pile material.

8. The recording apparatus of claim 3, wherein said pressing member is located on a heat insulating support.

9. The recording apparatus of claim 2, wherein said pressing member has a plurality of heat-resistant tapes stretched in parallel with the moving direction of said subsequent transfer material.

10. The recording apparatus of claim 2, wherein said heat member comprises a heat source and a heating body which face each other.

11. The recording apparatus of claim 10, wherein said plurality of heat-resistant tapes have in one of the spaces therebetween a transport roller for transporting said subsequent transfer material with pressing said subsequent transfer material onto said heating body.

12. The recording apparatus of claim 11, wherein said heating body comprises a heating plate.

13. The recording apparatus of claim 12, wherein a plane of said heating plate facing said subsequent transfer material is in the convexly curved form.

* * * * *